United States Patent [19]
Baker

[11] Patent Number: 6,038,152
[45] Date of Patent: Mar. 14, 2000

[54] ACTIVE RECTIFIER UTILIZING A FIXED SWITCHING PATTERN

[76] Inventor: Donal E. Baker, 10222 Springborough Dr., Rockford, Ill. 61107

[21] Appl. No.: 09/204,606

[22] Filed: Dec. 3, 1998

[51] Int. Cl.$^7$ .................................................. H02M 5/42
[52] U.S. Cl. .............................. 363/89; 363/126; 363/127
[58] Field of Search ............................... 363/82, 89, 126, 363/127

[56] References Cited

U.S. PATENT DOCUMENTS

| | | | |
|---|---|---|---|
| 4,447,868 | 5/1984 | Turnbull | 363/81 |
| 4,523,267 | 6/1985 | Mehl | 363/87 |
| 4,704,673 | 11/1987 | Busch | 363/98 |
| 4,730,243 | 3/1988 | Glennon | 363/44 |
| 4,906,860 | 3/1990 | Asaeda | 307/105 |
| 4,984,147 | 1/1991 | Araki | 363/84 |
| 5,034,874 | 7/1991 | Araki | 363/41 |
| 5,140,514 | 8/1992 | Tuusa et al. | 363/81 |
| 5,311,419 | 5/1994 | Shires | 363/65 |
| 5,321,598 | 6/1994 | Moran | 363/41 |
| 5,602,465 | 2/1997 | Clemente | 323/300 |
| 5,638,265 | 6/1997 | Gabor | 363/89 |
| 5,751,567 | 5/1998 | Toyozaki et al. | 363/89 |

*Primary Examiner*—Shawn Riley
*Attorney, Agent, or Firm*—Marshall O'Toole Gerstein Murray & Borun

[57] ABSTRACT

An active rectifier circuit includes a rectifier bridge having a plurality of passive rectifiers and a switching element coupled across each passive rectifier. A control circuit is coupled to the switching elements and senses reactive current flow and includes a phase-locked loop responsive to the reactive current flow and a circuit for developing switching patterns for the switching elements.

11 Claims, 3 Drawing Sheets

ACTIVE RECTIFIER UTILIZING A FIXED SWITCHING PATTERN

TECHNICAL FIELD

The present invention relates generally to power conversion devices, and more particularly to an active rectifier circuit for an electric power system.

BACKGROUND ART

Electric power systems often drive nonlinear loads which contribute to the generation of harmonics on the power distribution bus of the power system. It is generally desired to keep power quality high on the power distribution bus, and hence, amplitudes of harmonic currents generated by loads are typically regulated or eliminated to relatively small values. In aircraft electric power systems, the impedance of the generator and the distribution bus is relatively high, thus compounding the distortion effects caused by load harmonic currents. It is particularly desirable to keep the magnitudes of low order harmonics at a low level, because these harmonics require large and heavy filters which undesirably add to the size and weight of the power system.

A typical nonlinear load is a three-phase AC/DC rectifier which is used as a front end for various power conversion loads, such as electric motor driven hydraulic pumps, electric motor driven compressors and fans, etc. . . . It is commonly known that the triplen harmonics (i.e., 3rd, 6th, 9th, 12th, . . . multiples of the fundamental) and even harmonics (i.e., 2nd, 4th, 8th, 10th, . . . multiples of the fundamental) are virtually nonexistent in three-phase, no-neutral rectifier applications and accordingly do not affect the system or require filtering. However, the remaining harmonic components for six-pulse rectifiers have amplitudes equal to 1/n where n is the order of the harmonic and is equal to 5, 7, 11, 13, 17, 19, 21, . . . and so on to infinity. The component creating the biggest difficulty is the fifth harmonic, which effectively determines the size and weight of the required filter. Typically, this filter is too heavy and costly to provide a competitive solution, particularly where size and weight must be minimized, as in an aircraft or aerospace environment.

One approach to improving this situation is to increase the number of diodes in the rectifier bridge. For example, by utilizing two six diode bridges (and thus utilizing twelve diodes), the harmonic current distribution changes to n=11, 13, 23, 24, 35, 37, . . . an so on to infinity. Besides the reduction in the quantity of the harmonics, there is a beneficial elimination of the two lowest order (i.e., n=5 and 7) harmonics. As a result, the first harmonic to be filtered (i.e., the 11th) is higher in frequency and less in amplitude than the corresponding harmonic produced by the six diode rectifier bridge (i.e., the 5th). This means the filter requirements will be less for the 12 diode approach than the six diode approach. However, such a rectification circuit requires the use of a phase shifting autotransformer and two current sharing interphase transformers (IPT's), both of which add to the size, weight and cost of the overall circuit.

Further harmonic current magnitude reductions can be obtained by further extending the circuit topology to an 18 or 24 diode bridge; however, even more IPT's and a more complex phase shifting autotransformer must be used. Basically, the penalty for adding diodes to reduce harmonics is always offset by greater size, weight and cost. These factors are particularly detrimental in aircraft and aerospace power system applications.

A still further approach to reducing harmonics is to use what is typically referred to as an "active rectifier." An active rectifier is a standard six diode rectifier supplemented with an active switch (typically a transistor) connected across each diode. A relatively small filter is connected between the active rectifier and the three-phase AC power distribution bus for proper operation of the active filter and for filtering remnant higher order harmonics. By proper control of the active switches, it is possible to draw currents from the power bus with a substantial reduction in the lower order (i.e., harder to filter) harmonic currents. Typically, the active rectifier is controlled in a closed loop fashion to provide transfer switching commands on-the-fly and to provide the desired harmonic control and regulation of the rectified DC voltage at an independently controlled set point. It is commonly accepted in the industry that the basic switching frequency for the transistor(s) must be at least twice the frequency of the highest harmonic to be controlled. For example, in a 400 Hz aircraft power system in which the 5th, 7th, 11th, and 13th harmonics are to be reduced to near zero with an active rectifier, the maximum harmonic to be controlled is the 13th, which is 5200 Hz, and the base switching frequency for the active rectifier must be at least 10.4 kHz. This switching frequency is barely practical for today's IGBT (insulated-gate bipolar transistor) switching devices because at the power levels needed for most aircraft loads, the switching losses at this frequency dominate the total losses. Switching frequencies above 10 kHz create even higher switching losses, and therefore are not generally considered practical with IGBT's. Other potential switching semiconductors such as power FET's and MCT's (MOS-controlled thyristors) are also not practical for various other reasons. Thus, using the active rectifier with this control scheme to control harmonic currents above 5200 Hz is of doubtful practicality.

However, even with these limitations, the active rectifier is a practical harmonic control tool for 400 Hz systems because it can control up to the 13th harmonic, a capability which would require a more complex 18 or 24 diode rectifier and the attendant complex and heavy transformers, or a 12 diode rectifier with a much heaver filter to remove the 11th and 13th harmonics. The phase shifting transformer and IPT's needed for the 12, 18, or 24 diode rectifiers are not needed with the active filter. Thus, on a weight basis, the active rectifier is clearly superior. The active rectifier is also very competitive relative to manufactured costs when it is configured with the new low cost industrial power modules now available on the market which include all the diodes and transistors in a single integrated package. The only drawback for the active rectifier is the control circuit complexity and reliability when compared to the passive 12 diode rectifier, which requires no controls.

A new aircraft electrical power system architecture, called variable frequency, or VF, is currently being considered for aircraft and aerospace electric power systems. The generators used in these power distribution systems operate over a frequency range between 400 Hz and 800 Hz. It is in this application that the active rectifier, as conventionally envisioned, is not competitive due to the switching frequency limitation noted above. Specifically, in order to compete, the active rectifier must be able to control the 13th harmonic at the upper frequency of 800 Hz, i.e., 10.4 kHz. This, in turn, requires a 20.8 kHz minimum switching frequency, which is out of the practical range for power IGBT's and IGBT modules at the needed power ratings of 10 kHz or above.

SUMMARY OF THE INVENTION

In accordance with the present invention, an active rectifier circuit employs a simplified control methodology which reduces the switching frequencies required to eliminate low order harmonics.

More particularly, an active rectifier circuit includes a rectifier bridge including a plurality of passive rectifiers, a switching element coupled across each passive rectifier and a control circuit coupled to the switching elements. The control circuit includes means for sensing reactive current flow, a phase-locked loop (PLL) coupled to the sensing means and means coupled between the PLL and switching elements for developing switching patterns for the switching elements.

Preferably, the sensing means comprises a reactive current demodulator and an error detection circuit. Also preferably, the developing means comprises a memory having a fixed switching pattern stored therein, which may comprise a four-pulsed fixed pattern.

Still further in accordance with the preferred embodiment, three-phase power is applied to the rectifier bridge and the rectifier bridge includes six diodes and six switching elements coupled together in a full-bridge configuration. Also preferably, the PLL includes a phase detector which is responsive to each phase of the three-phase power.

In accordance with another aspect of the present invention, an active rectifier circuit includes a rectifier bridge including a plurality of passive rectifiers, a switching element coupled across each passive rectifier and means for sensing reactive current flow in the rectifier bridge. Means are coupled to the switching elements for causing the reactive power flow in the rectifier bridge to approach zero magnitude.

In accordance with yet another aspect of the present invention, an active rectifier circuit includes a polyphase rectifier bridge including a plurality of passive rectifiers connected together in a full-bridge configuration and a switching element coupled across each passive rectifier. A reactive current demodulator senses a magnitude of reactive current flow in the rectifier bridge and a phase-locked loop (PLL) is coupled to the reactive current demodulator and develops an output signal at a frequency dependent upon the reactive current flow magnitude. A switching pattern memory is coupled between the PLL and the switching elements and develops a fixed switching pattern for each switching element at a frequency which causes the reactive power flow in the rectifier bridge to approach zero magnitude.

The present invention can provide harmonic cancellation with switching frequencies that are much lower than twice the frequency of the highest harmonic frequency to be canceled. This desirable result means that the rectifier can be implemented with conventional IGBT's or industrial IGBT modules and retain competitive weight and/or cost advantages over the 12 diode rectifier for 400/800 Hz VF applications.

DESCRIPTION OF THE PREFERRED EMBODIMENT

Figure 1:
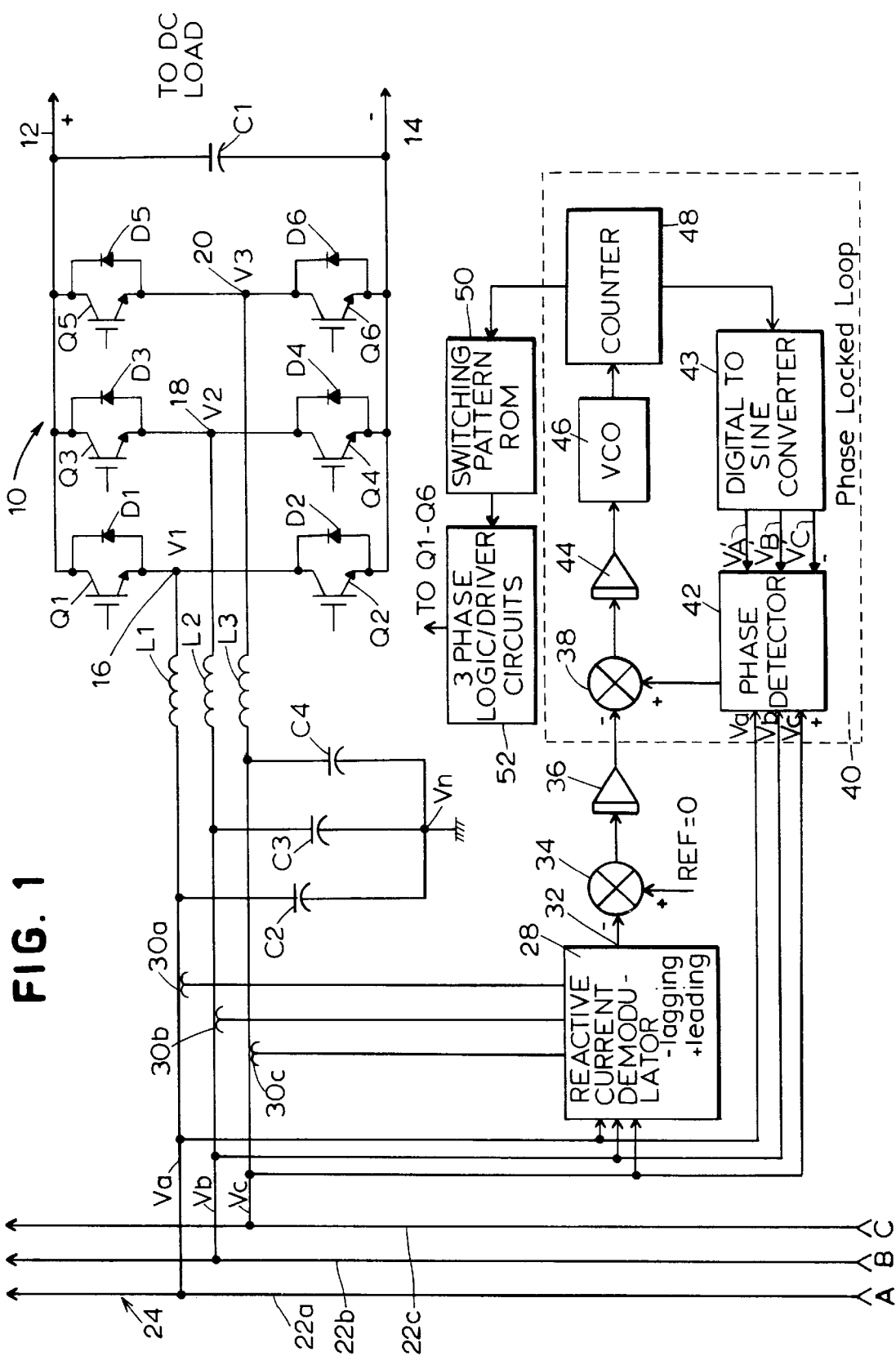
FIG. 1 is a combined block and schematic diagram of an active rectifier and control circuit incorporating the present invention.

Referring now to FIG. 1, an active rectifier circuit 10 includes a plurality of diodes D1–D6 connected together in a conventional three-phase bridge configuration across a DC bus comprising DC bus conductors 12, 14. Connected across each diode D1–D6 is an associated switching element comprising a transistor Q1–Q6, respectively. In the preferred embodiment, each switching element Q1–Q6 comprises an insulated gate bipolar transistor (IGBT), although other switching devices could be used such as a power FET, an MCT, a conventional thyristor, or the like. In addition to the foregoing, a filtering capacitor C1 is coupled across the DC link conductors 12, 14. A first input node 16 is formed at the junction between the diodes D1 and D2 and further input nodes 18 and 20 are formed at a junction between the diodes D3 and D4 and a junction between the diodes D5 and D6. The input nodes 16, 18 and 20 are coupled by inductors L1, L2 and L3 to conductors 22a, 22b and 22c, respectively, of a three-phase AC power distribution bus 24. Capacitors C2, C3 and C4 are connected between the conductors 22a, 22b and 22c and neutral potential $V_n$ and, together with the inductors L1–L3, provide filtering as required.

The switches Q1–Q6 are operated by a control circuit 26 which includes a reactive current demodulator 28. The demodulator 28 is responsive to the voltages on the conductors 22a–22c as well as the currents flowing into the active rectifier bridge 10 as detected by current sensors 30a, 30b and 30c. The current sensors may be of any suitable design as required or desired. The reactive current demodulator 28 develops a signal on a line 32 which represents the magnitude of the reactive current drawn by the active rectifier 10 from the distribution bus 24. While it is possible to sense only a single phase current and voltage in order to determine reactive current, it is preferred to sense these parameters for all three phases so that transient response is improved.

The signal on the line 32 is provided to an inverting input of a summer 34 having a non-inverting input that receives a reference signal which, in the preferred embodiment, represents zero reactive current magnitude. The resulting error signal is amplified by an amplifier 36 and is provided to an inverting input of a further summer 38 forming a part of a phase-locked loop (PLL) 40. A non-inverting input of the summer 38 receives a signal developed by a phase detector 42, which is responsive to the phase angle difference between voltages Va, Vb, Vc on the conductors 22a–22c and voltages $V_A'$, $V_B'$ and $V_C'$, developed by a digital-to-sine converter 43. The output of the phase detector 42 is a signal representing the phase angle of the PLL 40 relative to the phase angle of the voltages on the conductors 22a, 22b and 22c. The phase detector 42 is responsive to all three phase voltages so that it can quickly respond to changes therein.

Figure 2:
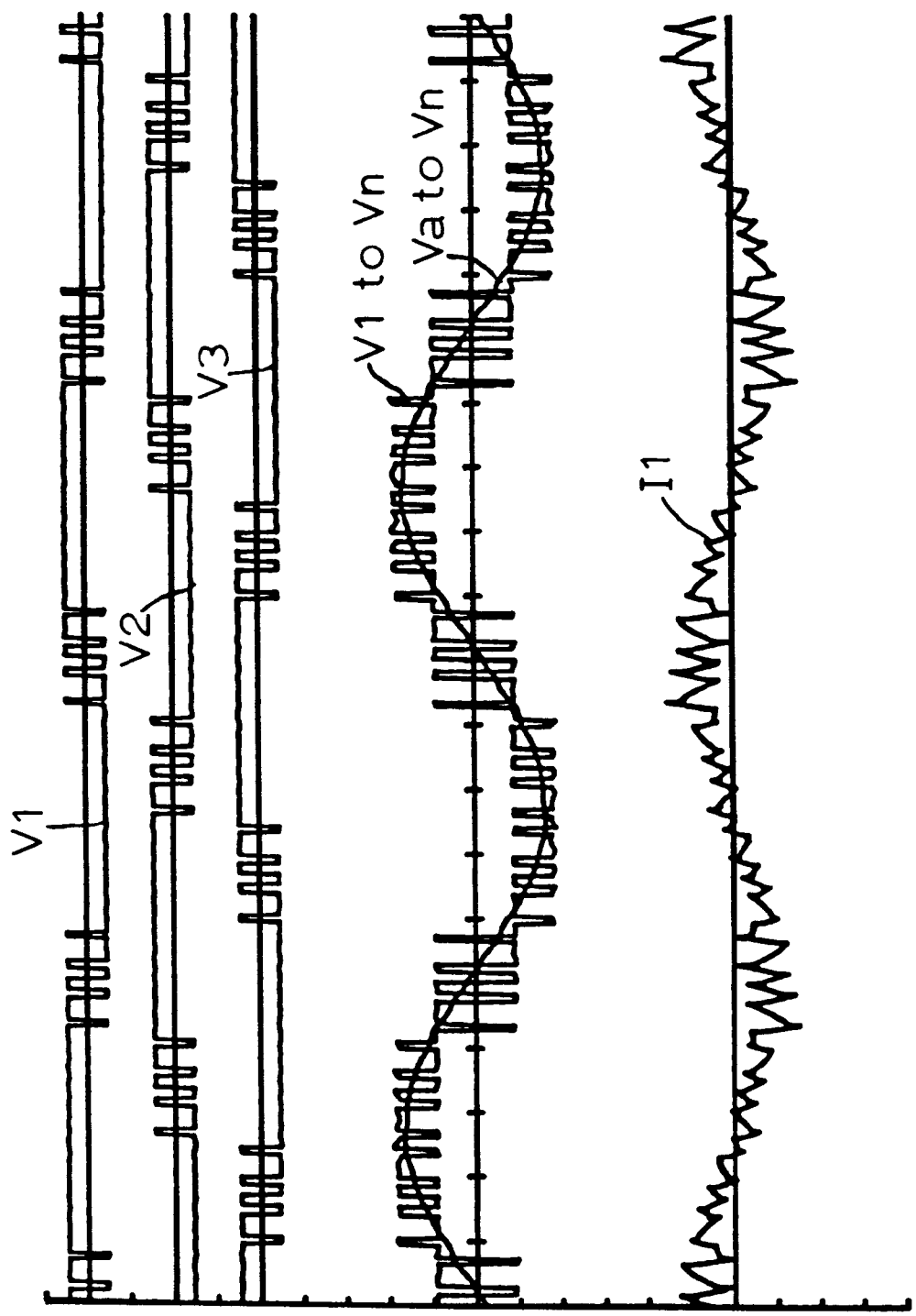
FIG. 2 is a series of waveform diagrams illustrating operation of the active rectifier of FIG. 1 under no-load conditions.

The further summer 38 develops a phase error signal which is filtered by an integrator to eliminate noise and other unwanted frequency components (the integrator 44 is fast as compared to a single phase PLL intergrator) and the resulting signal is provided to a voltage controlled oscillator (VCO) 46. The pulses developed by the VCO 46 are counted by a modulo counter 48 which in turn develops addresses for a read-only memory 50 that stores a fixed switching pattern. Specifically, the counter 48 counts upwardly, thereby sequentially addressing consecutive memory locations in the ROM 50 in order to develop a four-pulse fixed switching pattern. The switching pattern is provided to three-phase logic and driver circuits 52, which in turn provide base drive signals to the switching elements Q1–Q6. The resulting voltages V1, V2 and V3 developed at the nodes 16, 18 and 20, respectively, are illustrated in FIG. 2, together with the voltage V1 at the node 16 relative to the voltage $V_n$ and the voltage Va on the AC power distribution bus conductor 22a relative to $V_n$. Also illustrated is the current I1 flowing through the inductor L1. The amplitudes of the voltages V1–V3 are determined by the magnitude of the DC bus voltage and PWM notches are formed in each voltage waveform so as to cancel the 5th, 7th, 11th and 13th harmonics.

Figure 3:
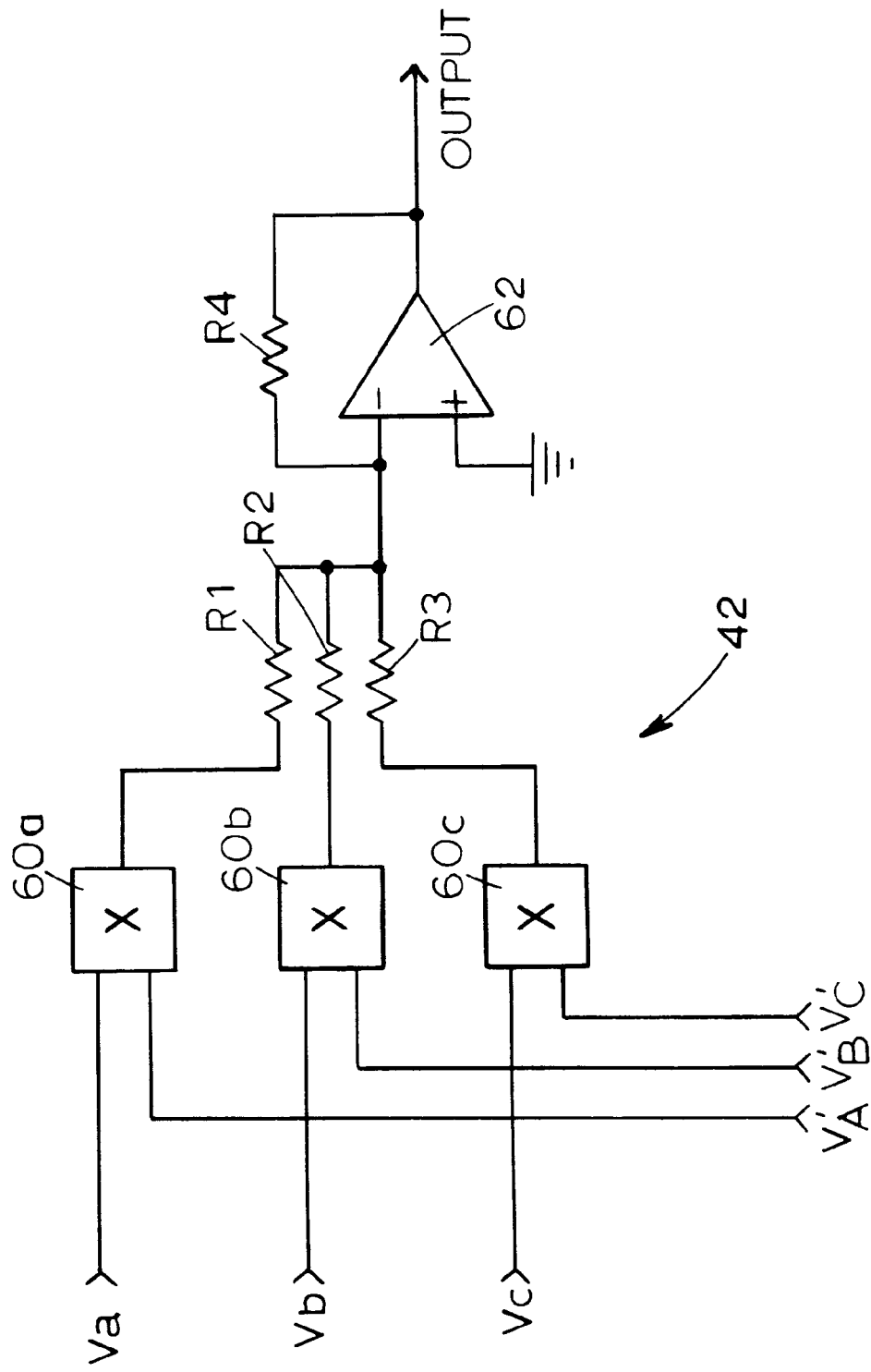
FIG. 3 is a combined schematic and block diagram of the phase detector of FIG. 1.

Referring to FIG. 3, the phase detector 42 includes multipliers 60a, 60b, 60c, each of which multiplies one of the voltages Va, Vb, Vc with a corresponding voltage $V_A'$, $V_B'$ and $V_C'$ developed by the digital-to sine converter 43. Preferably, the voltages Va–Vc and $V_A'$–$V_C'$ are scaled by any suitable circuitry to the same magnitude (preferably unity magnitude) and the voltages Va–Vc are displaced 120° relative to one another, as are the voltages $V_A'$–$V_C'$. The multipliers 60a–60c are coupled by resistors R1–R3 to an inverting input of an operational amplifier (op amp) 62. An output of the op amp 62 is connected to the inverting input by a further resistor R4, while a non-inverting input is coupled to ground. Preferably, the resistors R1–R3 have equal resistances equal to 1.5 times the resistance of the resistor R4. The phase detector 42 develops a substantially ripple-free output, owing to the summation of the 120° phase displaced outputs of the multipliers 60a–60c by the op amp 62. This summation causes the ripple components in the signals developed by the multipliers 60a–60c to cancel while, at the same time, obtaining the desired error signal. Because the output of the detector is substantially ripple-free, the integrator 44 can be made very fast, thereby resulting in a very fast slew rate for the PLL 40.

The counter 48 also develops a feedback signal for the phase detector 42, which compares the feedback signal to the voltages Va, Vb, Vc on the conductors 22a–22c in order to develop the output signal thereof.

Generally, the preferred method of control of the invention is to slave the switching frequency (i.e., the fundamental frequency component of the switching pattern) to the phase angle of the system bus voltage. In fact, this is the only controlled parameter and the PLL 40 is used for this function. The input to the PLL 40 is controlled by the reactive fundamental current drawn by the active rectifier. This AC line current is sensed where the active rectifier is connected to the AC bus, i.e., between the AC bus conductors 22a, 22b, 22c and the input filter capacitors C2, C3, C4. Simple demodulation of the input current into the reactive current component and then using this signal to control the phase-locked loop completes the control architecture. This ensures that the Thevenin voltage of the active rectifier (which is tied to the DC output voltage by virtue of a fixed modulation index of 1.0) is always properly related to the AC system voltage in terms of phase angle for all power flow conditions. This also ensures that the active rectifier exhibits a unity power factor angle relationship to the power distribution bus, again, similar to a simple passive rectifier.

By way of example, consider the active rectifier running at no load with its output voltage too low. Under these conditions, the magnitude of the Therein voltage of the active rectifier is also low (due to low DC link voltage and unity modulation index). Those skilled in the art will recognize that the inductors in the input LC filter, under these conditions, cause a reactive lagging current to flow into the active rectifier. This reactive lagging current is demodulated and applied to the PLL 40 at a polarity to cause the counter 48 to slow down and subsequently retard the angle of the active rectifier to a larger lagging position relative to the bus voltage. The lagging phase angle across the filter inductor causes real power to flow from the AC bus to the active rectifier. However, because there is no load on the active rectifier, this power can only flow into the capacitor C1 and increases its voltage accordingly. As the voltage across the capacitor C1 increases, so does the Therein voltage of the active rectifier (again, due to the unity modulation index). Finally, when the "correct" Therein voltage is reached, the reactive current reaches zero (i.e., unity power factor), thereby causing the PLL 40 to halt any further change in angle relative to the AC bus.

Conversely, excessive DC voltage causes the phase angle of the PLL 40 to advance relative to the bus voltage, and takes energy out of the capacitor C1 to reduce the DC link voltage and the Therein voltage to the proper level. It can be seen that as load is applied to or removed from the output of the active rectifier, the PLL 40 always acts in a manner to restore the active rectifier to the correct phase angle to maintain power flow and DC voltage to the proper level at or very near unity power factor.

Using a fixed switching pattern for the active rectifier, as illustrated in FIG. 1, does not offer as many degrees of control as a closed loop pattern control. On the other hand, the switch control methodology described herein can be implemented by straightforward control circuits and can provide harmonic cancellation with switching frequencies that are much lower than twice the frequency of the highest harmonic frequency to be canceled. For example, a four pulse fixed pattern as shown in FIG. 2 can be used to eliminate four harmonics and requires, by definition, that the switching frequency be only nine times the fundamental frequency. Thus, for a 400 Hz fixed frequency system, switching frequencies on the order of 9×400=3600 Hz are required in order to eliminate the 5th, 7th, 11th and 13th harmonics. This is an improvement in switching frequency of almost a factor of three when compared to the closed loop pattern approach. For a 400 Hz to 800 Hz VF system operating at 800 Hz, the switching frequency need only be 7200 Hz to eliminate those same harmonics. This fixed pattern approach operating on an 800 Hz bus would, therefore, have lesser switching losses (owing to the required switching at 7.2 kHz) than a closed loop switching pattern approach operating on a 400 Hz power bus (requiring switching frequencies on the order of 10.4 kHz).

As noted above, the fixed pattern active rectifier can be implemented with conventional switching devices such as IGBT's or industrial IGBT modules and retain the competitive weight and/or cost advantage over the 12 diode rectifier for 400–800 Hz VF applications. Also as noted above, in order to utilize this fixed pattern architecture, other features must be sacrificed. For instance, it is known that if a four pulse fixed pattern is used to eliminate the first four harmonics, then it has extremely limited ability to control the amplitude of the fundamental component. This means that the four pulse fixed pattern active rectifier cannot change or regulate the amplitude of the DC voltage produced to any significant degree. Similar to a passive rectifier, the DC voltage which is generated will be on the order of 270 volts DC for a 200 volt line-to-line AC input, with small variations about this point depending upon the average load current and the values of the inductors L1–L3. The DC voltage will essentially follow the input voltage and encounter droop as load current changes. Phase angle is the only directly controlled parameter and this is done in three-phase applications using a very high bandwidth PLL, thus making it an almost transparent control loop. This active rectifier will, therefore, mimic a conventional simple rectifier in nearly all respects, including DC voltage characteristics and near unity power factor, but with better harmonic control and better weight and cost. While this desirable result is obtained at the cost of not being able to regulate the amplitude of the DC voltage that is produced, it is believed that this disadvantage is more than offset in those situations where one or motor controllers receive the resulting DC power. Typically, motor controllers have the ability to control fundamental voltage amplitude, and thus can accommodate this shortcoming. In fact, it would be excessive in terms of circuit design to provide the ability to regulate the DC output voltage of the active rectifier when a motor controller is driven thereby having the ability to deal with an unregulated DC output voltage owing to the excessive control circuit complexity and the possibility of worsening system-wide system control stability. Fewer control loops are always preferred in these instances.

It should be noted that the switching pattern ROM 50 may instead store a different fixed pattern, or may store multiple patterns to provide a greater degree of controllability, if desired. Also, the phase detector 42 may instead be responsive to less than all of the phase voltages on the conductors 22a–22c.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

I claim:

1. An active rectifier circuit, comprising:

a rectifier bridge including a plurality of passive rectifiers and a switching element coupled across each passive rectifier; and a control circuit coupled to the switching elements including means for sensing reactive current flow, a phase-locked loop (PLL) coupled to the sensing means and means coupled between the PLL and the switching elements for developing switching patterns for the switching elements, wherein the developing means comprises a memory having a four pulse fixed switching pattern stored therein.

2. The active rectifier circuit of claim 1, wherein the sensing means comprises a reactive current demodulator and an error detection circuit.

3. The active rectifier of claim 1, wherein three-phase power is applied to the rectifier bridge and wherein the rectifier bridge includes six diodes and six switching elements coupled together in a full-bridge configuration.

4. The active rectifier of claim 3, wherein the PLL includes a phase detector responsive to each phase of the three-phase power.

5. An active rectifier circuit, comprising:

a rectifier bridge including a plurality of passive rectifiers and a switching element coupled across each passive rectifier;

means for sensing reactive current flow in the rectifier bridge; and means coupled to the switching elements for causing the reactive power flow in the rectifier bridge to approach zero magnitude wherein the causing means includes means for developing a switching pattern for each switching element including a memory having a four pulse fixed switching pattern stored therein and means for accessing the memory including a phase-locked loop (PLL).

6. The active rectifier circuit of claim 5, wherein the sensing means comprises a reactive current demodulator and an error detection circuit.

7. The active rectifier of claim 5, wherein three-phase power is applied to the rectifier bridge and wherein the rectifier bridge includes six diodes and six switching elements coupled together in a full-bridge configuration.

8. The active rectifier of claim 7, wherein the PLL includes a phase detector responsive to each phase of the three-phase power.

9. An active rectifier circuit, comprising:

a polyphase rectifier bridge including a plurality of passive rectifiers connected together in a full-bridge configuration and a switching element coupled across each passive rectifier;

a reactive current demodulator which senses a magnitude of reactive current flow in the rectifier bridge;

a phase-locked loop (PLL) coupled to the reactive current demodulator and developing an output signal at a frequency dependent upon the reactive current flow magnitude; and a switching pattern memory coupled between the PLL and the switching elements and developing a four pulse fixed switching pattern for each switching element at a frequency which causes the reactive power flow in the rectifier bridge to approach zero magnitude.

10. The active rectifier of claim 9, wherein three-phase power is applied to the rectifier bridge and wherein the rectifier bridge includes six diodes and six switching elements.

11. The active rectifier of claim 10, wherein the PLL includes a phase detector responsive to each phase of the three-phase power.

* * * * *